(12) United States Patent
Huang

(10) Patent No.: US 10,484,826 B2
(45) Date of Patent: Nov. 19, 2019

(54) SYSTEM AND DEVICE FOR INTERNET OF THINGS

(71) Applicant: International Mobile IOT Corp, Taipei (TW)

(72) Inventor: Jung-Tang Huang, Taipei (TW)

(73) Assignee: INTERNATIONAL MOBILE IOT CORP., Taipei (TW)

( * ) Notice: Subject to any disclaimer, the term of this patent is extended or adjusted under 35 U.S.C. 154(b) by 0 days.

(21) Appl. No.: 14/616,093

(22) Filed: Feb. 6, 2015

(65) Prior Publication Data

US 2016/0234633 A1   Aug. 11, 2016

(51) Int. Cl.
| | |
|---|---|
| *H04W 4/02* | (2018.01) |
| *H04W 4/029* | (2018.01) |
| *G06K 7/10* | (2006.01) |
| *H04L 29/08* | (2006.01) |
| *H04W 4/80* | (2018.01) |

(52) U.S. Cl.
CPC ........ *H04W 4/029* (2018.02); *G06K 7/10366* (2013.01); *H04L 67/12* (2013.01); *H04L 67/18* (2013.01); *H04L 67/22* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 2001/0018338 A1* | 8/2001 | Tezuka | H01Q 1/088 455/411 |
| 2003/0163261 A1* | 8/2003 | Iida | H04N 1/00127 702/19 |
| 2013/0046692 A1* | 2/2013 | Grigg | G06Q 40/00 705/44 |
| 2014/0002188 A1* | 1/2014 | Chen | H03F 3/19 330/250 |
| 2014/0192658 A1* | 7/2014 | Venkatraman | G01S 19/14 370/252 |
| 2015/0186467 A1* | 7/2015 | Voonna | G06F 17/30528 707/736 |
| 2016/0127523 A1* | 5/2016 | Rouaissia | H04M 1/0266 455/566 |

\* cited by examiner

*Primary Examiner* — Mazda Sabouri
(74) *Attorney, Agent, or Firm* — JCIPRNET

(57) ABSTRACT

An event monitoring system comprises a server, a communication network, a wireless tag that comprises a wireless module, a MCU, a switch connected to the wireless module and the MCU, wherein the MCU controls the switch to change between short range communication and long range communication; wherein the wireless tag receives a location information from a node device via the wireless module with long range communication; wherein the wireless tag determines a first location according to the location information and sends the first location to the server via the communication network; wherein the wireless tag detects a terminal device by wireless module using short range communication; after detecting the terminal device, the wireless tag sends an event information to the server via the communication network using long range communication.

18 Claims, 6 Drawing Sheets

SYSTEM AND DEVICE FOR INTERNET OF THINGS

TECHNICAL FIELD

The present invention relates generally to a system and a device for internet of things, more specifically an internet of things (IOT) system with a wearable device to provide monitoring and management of location, habit, movement, and event of a user of the wearable device.

BACKGROUND

Traditionally, RFID (Radio Frequency Identification) operates passively with a communication range between a few millimeters to tens of centimeters. The passive RFID is able to connect with a mobile phone, but usually not able to equip any sensor. Another type of RFID operates proactively with a power source, therefore the proactive RFID is able equip sensor and have a communication range such as few meters. However, the proactive RFID is not able to connect with a mobile phone.

RFID and NFC (Near Field Communication) operate at 13.56 MHz to comply with standards such as ISO14443 or ISO18092, so the corresponding readers for RFID and NFC must have a large size antenna, and the size of RFID and NFC tag cannot be reduced effectively due to the size of antenna. Wearable devices usually are designed light weight and small for easy wearing, therefore RFID and NFC reader or tag are not able to be installed in a common wearable device. Therefore, most of e-wallets (electronic wallet) are designed in a card shape. Common antenna size of RFID or NFC tag is with about 2.5~3.5 cm diameter or simply a 1.8 cm×1.8 cm, and common antenna size of RFID or NFC reader is even bigger than antenna size of tag. Thus, portable devices, wearable devices, or mobile devices with RFID or NFC technology are installed with tags but not readers. This greatly limits the application field of RFID and NFC.

In view of the above, currently there's not a wireless device is able to communicate from a few millimeter to tens of meters, carry sensors, connect with a mobile device or be installed in a mobile device or wearable device, and connect with a mesh network or being a part of a mesh network. Therefore, a wireless device and corresponding system with a communication network to solve the above problem is needed to improve applications of IOT (internet of things).

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein.

In accordance with common practice, the various described features are not drawn to scale and are drawn to emphasize features relevant to the present disclosure. Like reference characters denote like elements throughout the figures and text.

DETAILED DESCRIPTION

Figure 1:
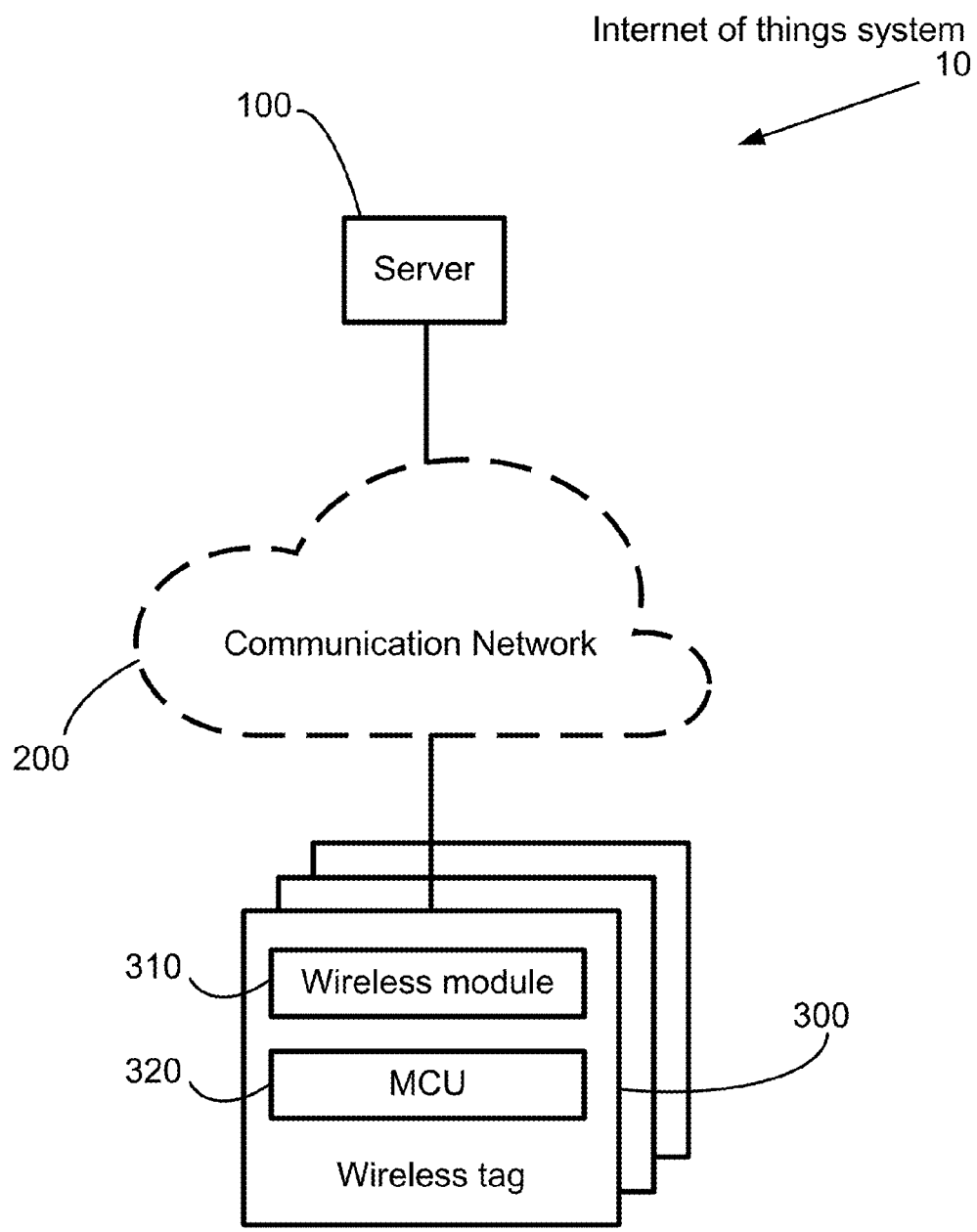
FIG. 1 is a schematic illustration of an IOT system according to one embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

It will be understood that the term "and/or" includes any and all combinations of one or more of the associated listed items. It will also be understood that, although the terms first, second, third etc. may be used herein to describe various elements, components, regions, parts and/or sections, these elements, components, regions, parts and/or sections should not be limited by these terms. These terms are only used to distinguish one element, component, region, part or section from another element, component, region, layer or section. Thus, a first element, component, region, part or section discussed below could be termed a second element, component, region, layer or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The description will be made as to the embodiments of the present invention in conjunction with the accompanying drawings in FIGS. 1 to 6. Reference will be made to the drawing figures to describe the present invention in detail, wherein depicted elements are not necessarily shown to scale and wherein like or similar elements are designated by same or similar reference numeral through the several views and same or similar terminology.

FIG. 1 schematically shows an IOT (internet of things) system 10 according to one embodiment of the present invention. The IOT system 10 may comprise a server 100, a communication network 200, and a plurality of wireless tags 300, wherein each wireless tag 300 may comprise a wireless module 310 and a MCU (micro-controller unit) 320. The wireless tag 300 may use the wireless module 310 to communicate with the server 100 via the communication network 300. The wireless module 310 may be Bluetooth, Wi-Fi, ZigBee, etc. The MCU 320 may comprise a location information, wherein the location information may be broadcasted to any other wireless device by the wireless module 310. The MCU 320 may also comprise other types of information such as identification information, account information, etc. In the IOT system 10, a plurality of the wireless tag 300 may form a network, wherein the network may be a meshed network, a star network, etc. The size of the network may be flexible that any wireless tag 300 may join or leave the network at any time.

In one embodiment of the present invention, the IOT system 10 may operate to locate any wireless tag 300 which is connected to the IOT system 10 by a locating method. The locating method may be practiced as the plurality of wireless tag 300 broadcast the location information to any other wireless tags 300 within the range, any other wireless tags 300 receive the location information may use the MCU 320 to determine a current location of itself based on the location information and the RSSI (received signal strength indicator). The wireless tag 300 may receive more than one location information from other wireless tags 300, each location information may comprises a RSSI of its own, therefore the more location information one wireless tag 300 receives, the more accurate the current location is. Alternatively, the wireless tag 300 may send a locating signal to at least one surrounding wireless tags 300, and the RSSI of the locating signal may be provided to the server 100 via the communication network 200 by the at least one surrounding wireless tags 300. Thus, each the at least one surrounding wireless tags 300 may send the RSSI and the location information to the server 100. The server 100 may determine the current location of the wireless tag 300 based on the RSSI and the location information of the at least one surrounding wireless tags 300. It should be noted that the same approach applies to all embodiment of the present invention. Therefore, the current location of wireless tag 300 may be determined as long as there's a plurality of wireless tags 300. It should be noted that, the determination of current location may comprise trilateration, triangulation or any other known positioning method, and the RSSI may be substituted as needed for the corresponding positioning method.

In one embodiment of the present invention, the location information may comprise coordinate, such as longitude, latitude, altitude, cylindrical coordinate or any other forms of three dimensional coordinate systems, wherein the coordinate may be a definite coordinate which is applicable in real world or a relative coordinate that is only applicable in a specific area where the at least one wireless tag 300 may be installed.

Figure 2:
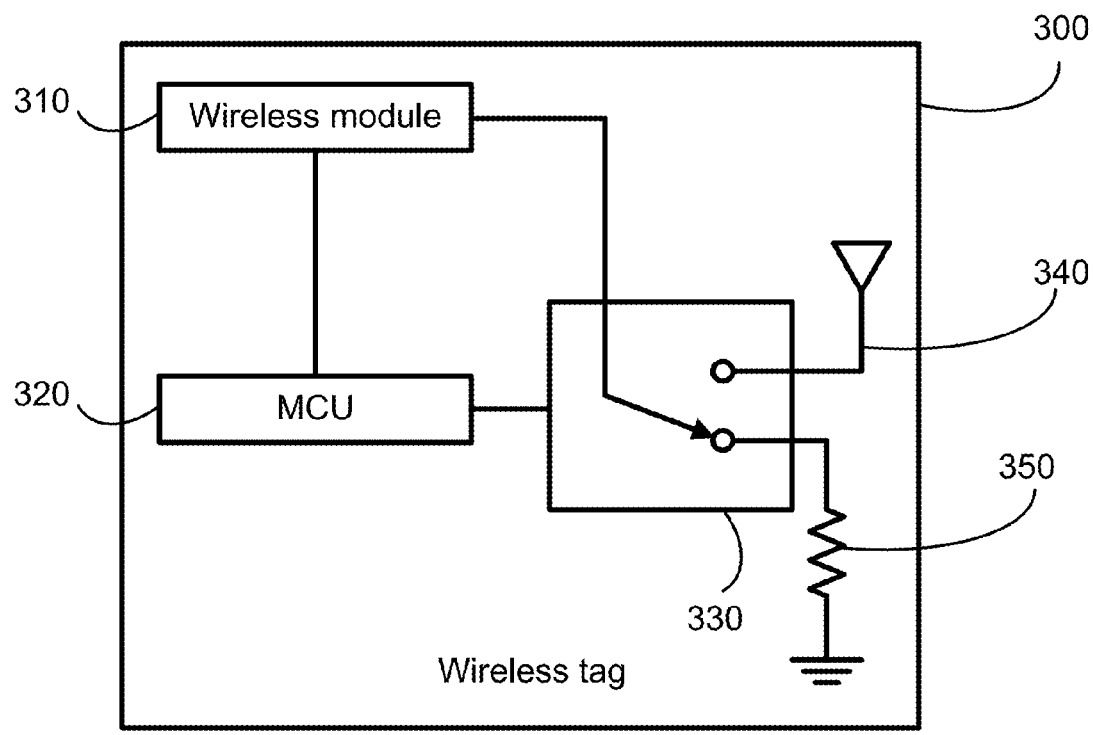
FIG. 2 is a schematic illustration of a wireless tag according to one embodiment of the present invention.

FIG. 2 schematically shows a wireless tag 300 according to one embodiment of the present invention. The wireless tag 300 may comprise a wireless module 310, a MCU 320, a switch 330, an antenna 340, and a resistor 350. The wireless module 310 is connected to the switch 330, and the switch 330 is connected to the antenna 340 and the resistor 350, wherein the resistor 350 is connected to the ground. The switch 330 may be controlled by the MCU 320 to switch between the antenna 340 and the resistor 350.

In one embodiment of the present invention, a plurality of the wireless tags 300 may communicate with each other through the wireless module 310. The switch 330 may switch between the antenna 340 and the resistor 350 to enable the wireless tag 300 to communicate with either a long range communication or a short range communication. When the switch 330 is switched to connect the antenna 340 to the wireless module 310, the wireless tag 300 may communicate with other wireless tags 300 with a long range communication. When the switch 330 is switched to connect the resistor 350 to the wireless module 310, the wireless tag 300 may communicate with other wireless tags 300 with a short range communication. Thus the plurality of wireless tags 300 may communicate with each other via either the long range communication or short range communication. The short range communication is about few millimeters to few centimeters, and the long range communication is longer than the short range communication in comparison. For example, to achieve a short range communication, using a TI CC2540/2541 chip at power level −23 dB with a resistor of 50Ω may achieve a 3 cm Bluetooth communication.

Figure 3:
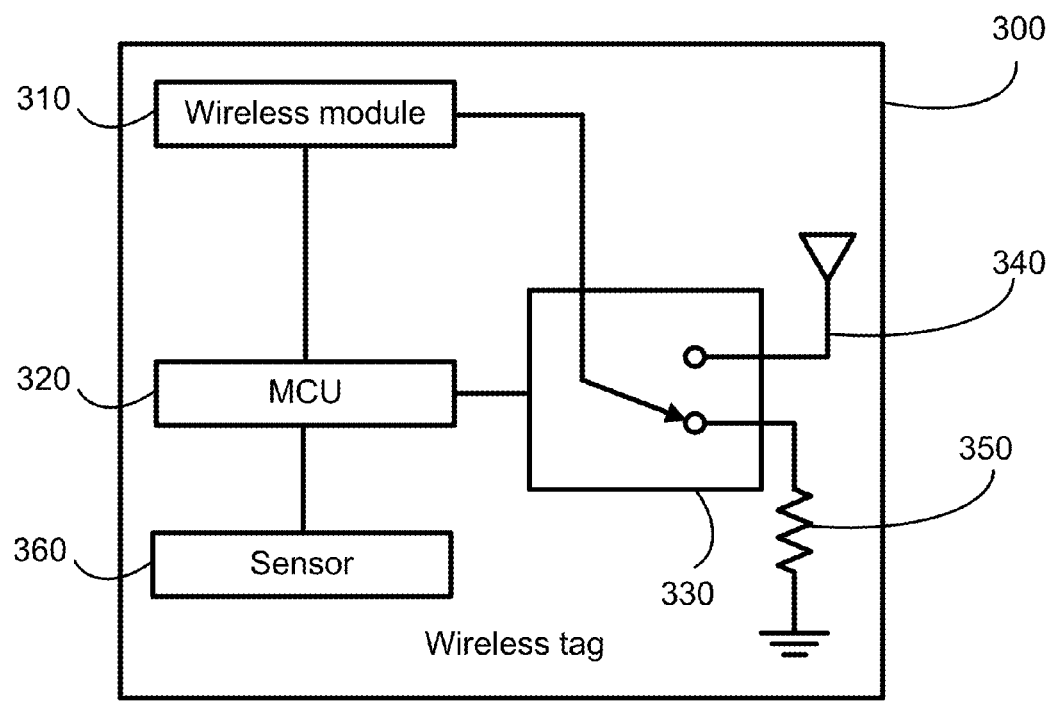
FIG. 3 is a schematic illustration of the wireless tag according to another embodiment of the present invention.

FIG. 3 schematically shows a wireless tag 300 according to one embodiment of the present invention. The wireless tag 300 in FIG. 3 further comprises a sensor 360 comparing to FIG. 2. The sensor 360 may be any type of sensors such as physiological or non-physiological sensors, wherein the sensor 360 may either detect a user information or an event information. The user information may comprise a user's identification information, movement, personal distinctive feature, physiological parameters, current location of the user, etc. The event information may comprise what is the event, location of the event, identification information of a user who triggers the event, status of the event, etc. Both the user information and the event information may comprise a time information, wherein the time information may be determined by the MCU 320 or the server 100 and sent together with the user information and/or event information when the user information and the time information are sent from the wireless tag 300 to the server 100 via the communication network 200.

In one embodiment of the present invention, the wireless tag 300 may be installed in a wearable device, wherein the wearable device may be a bracelet, necklace, glasses, etc. In other embodiments, the wireless tag 300 may be implemented on a PCB board to be connected in any electronic devices. A user wearing the wearable device installed with the wireless tag 300 may be monitored by the IOT system 10. For example, sensor 360 of the wireless tag 300 may be a physiological sensor. Thus, the physiological status of the user may be monitored when the user wears the wearable device installed with the wireless tag 300. Physiological status may be heart rate, blood pressure, blood glucose, respiration rate, temperature, etc. Alternatively, the wireless tag 300 may also be installed in other types of terminal devices other than wearable devices. For example, an electronic blood pressure gauge installed with the wireless tag 300. In this case, instead of comprising the sensor 360, the wireless tag 300 may have the MCU 320 connected with the blood pressure gauge, therefore the blood pressure measured by the electronic blood pressure gauge may be sent to the server 100 as the user information via the communication network 200 for monitoring purposes.

In another embodiment of the present invention, the wireless tag 300 may comprise the sensor 360 as a non-physiological sensor such as a movement sensor. The wireless tag 300 may be installed in a wearable device to be wore by a user. Thus, the movement of the user wearing the wearable device may be detected by the movement sensor, and the detected movement may be sent to the server 100 via the communication network 200. The movement sensor may be accelerometer, gyroscope, etc. Therefore, the movement of the user may be monitored by the IOT system 10, wherein the server 100 of the IOT system 10 receives the detected movement as the user information from the wireless tag 300 in the wearable device. Furthermore, the locating method mentioned before may be applied to determine the current location of the user by the wireless tag 300 installed in the wearable device, the current location of the user may be sent to the server 100 via the communication network 200 together with the detected movement as the user information. The same approach may apply to any other types of terminal devices in all embodiments of the present invention.

In one embodiment of the present invention, the IOT system 10 may be used to monitor an event. To monitor the event, at least one wireless tag 300 may be installed at an object associated with the event. For example, the wireless tag 300 may be installed on a door with an open/close sensor as the sensor 360, so the status of the event related to the door may be sent to the server 100 as the event information via the communication network 200, wherein the status may be "door closed" or "door opened". The same approach may apply to any other type of event monitoring depends on the sensor 360. For example, the wireless tag 300 may comprise a pressure sensor as the sensor 360, and the wireless tag 300 may be installed on a sofa. Thus, the frequency and duration of the sofa being used may be monitored as event information. Furthermore, the locating method mentioned before may be applied to determine the location of the event by the wireless tag 300 installed on the sofa, the current location of the wireless tag 300 may be sent to the server 100 via the communication network 200 as the event information.

Figure 4:
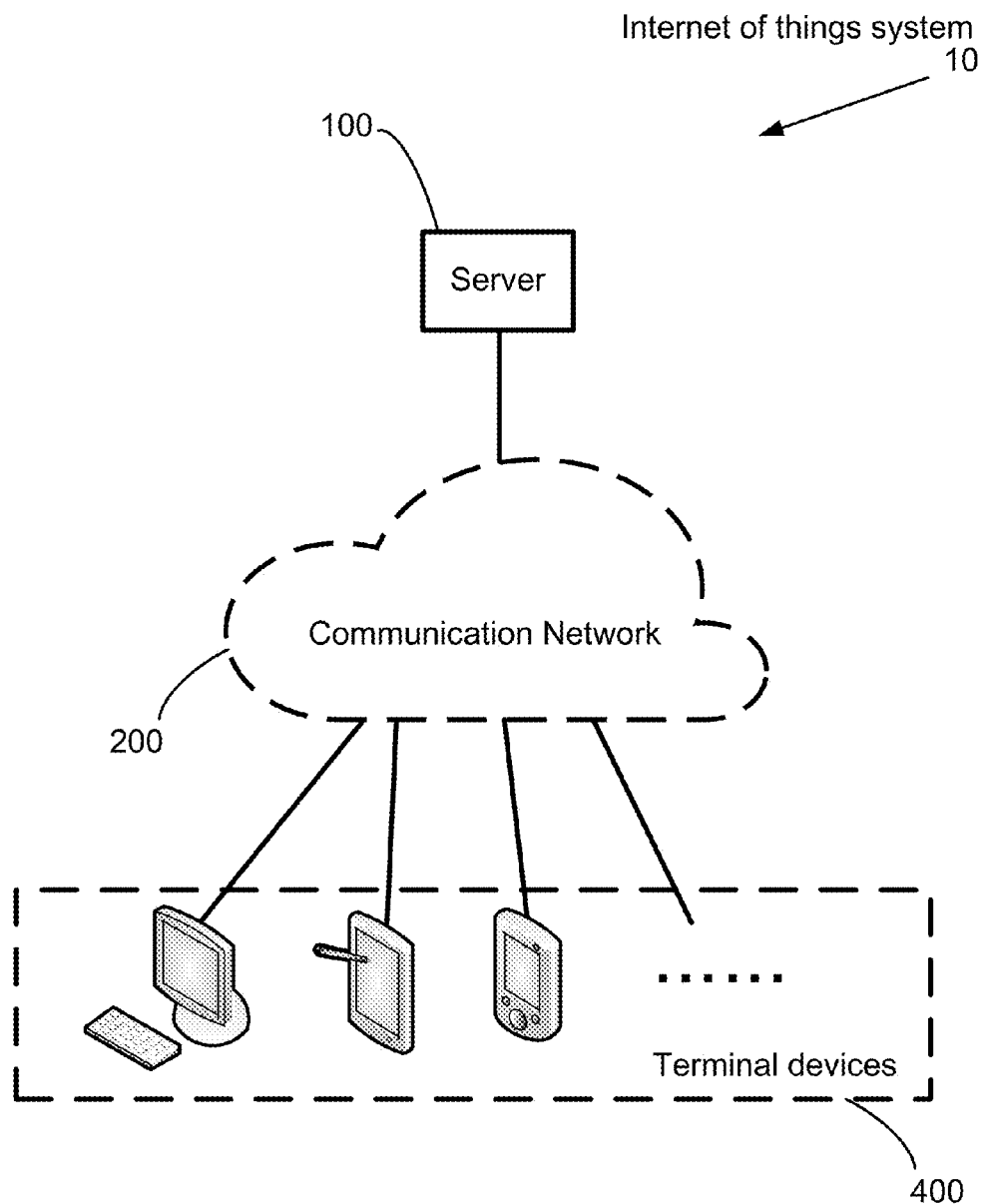
FIG. 4 is a schematic illustration of the IOT system with a plurality of terminal devices according to one embodiment of the present invention.

FIG. 4 schematically shows the IOT system 10 with a plurality of terminal devices 400 connected according to one embodiment of the present invention. Each of the plurality of terminal devices 400 may comprise a wireless tag 300 with or without sensor 360 as mentioned before. The plurality of terminal devices 400 may communicate with each other directly without the communication network 200 or indirectly via the communication network 200, wherein indirect communication via the communication network 200 is realized by the long range communication. The plurality of terminal devices may be wearable devices, mobile devices, node devices, or any other types of devices or objects installed with the wireless tag 300.

In one embodiment of the present invention, the IOT system 10 may be operated to verify a financial transaction, wherein the plurality of terminal devices 400 of the IOT system 10 may comprise a wearable device (not shown), a transaction device (not shown), and a node device (not shown). Each of the above terminal device 400 may be installed with a wireless tag 300. The wireless tag 300 of the wearable device may comprise a user's identification information which is regarded as the user information. The wireless tag 300 of the node device may comprise a first location information. The wireless tag 300 of the transaction device may comprise a second location information. A financial transaction event may be monitored by the IOT system 10 as follow: A user of the wearable device may use a credit card, bank card, any device with account information, or wireless tag 300 stored with the account information as a user information which is adapted for a financial transaction with the transaction device. The account information of the user is sent to the server 100 via the communication network 200 by the transaction device. After receiving the account information of the user, server 100 may request the identification information and a current location from the user. The current location may be determined by the locating method as the wearable device receives the first location information from the node device and determines the current location based on the first location information and the RSSI of the first location information. The wearable device may send the current location and the identification information to the server 100 via the communication network 200 for verification against the account information and the second location information, wherein the second location information is where the financial transaction event takes place. The server 100 may match the identification information to the account information to ensure the one making the financial transaction is the owner of the account. At the same time, the current location of the wearable device is matched against the second location information to ensure the owner of the account is at the location where the financial transaction event takes place. And the financial transaction will only be successful when both matches above shows that the one making the financial transaction is the account owner and at the place of financial transaction. Alternatively, the verification of the account owner may also be done by further comprising a sensor 360 in the wireless tag 300 of the wearable device, wherein the sensor 360 may provide a personal distinctive feature like an identification information to the server 100 as user information. Thus the personal distinctive feature may be used to match the account information to ensure the one making the financial transaction is the owner of the account. The personal distinctive feature may be a fingerprint, heart rate, pulse, blood glucose, blood pressure, etc. It should be noted that monitoring of the financial transaction event is just an example to illustrate event monitoring of the IOT system 10. Other types of event monitoring may also be possible by the IOT system 10 collecting various user information and/or event information from various terminal devices 400. Thus, the IOT system 10 may obtain information about an event by the server 100 receiving user information and/or event information from terminal devices 400 in order to determine what the event is, where the event is, the event related being, when the event is, etc.

Figure 5:
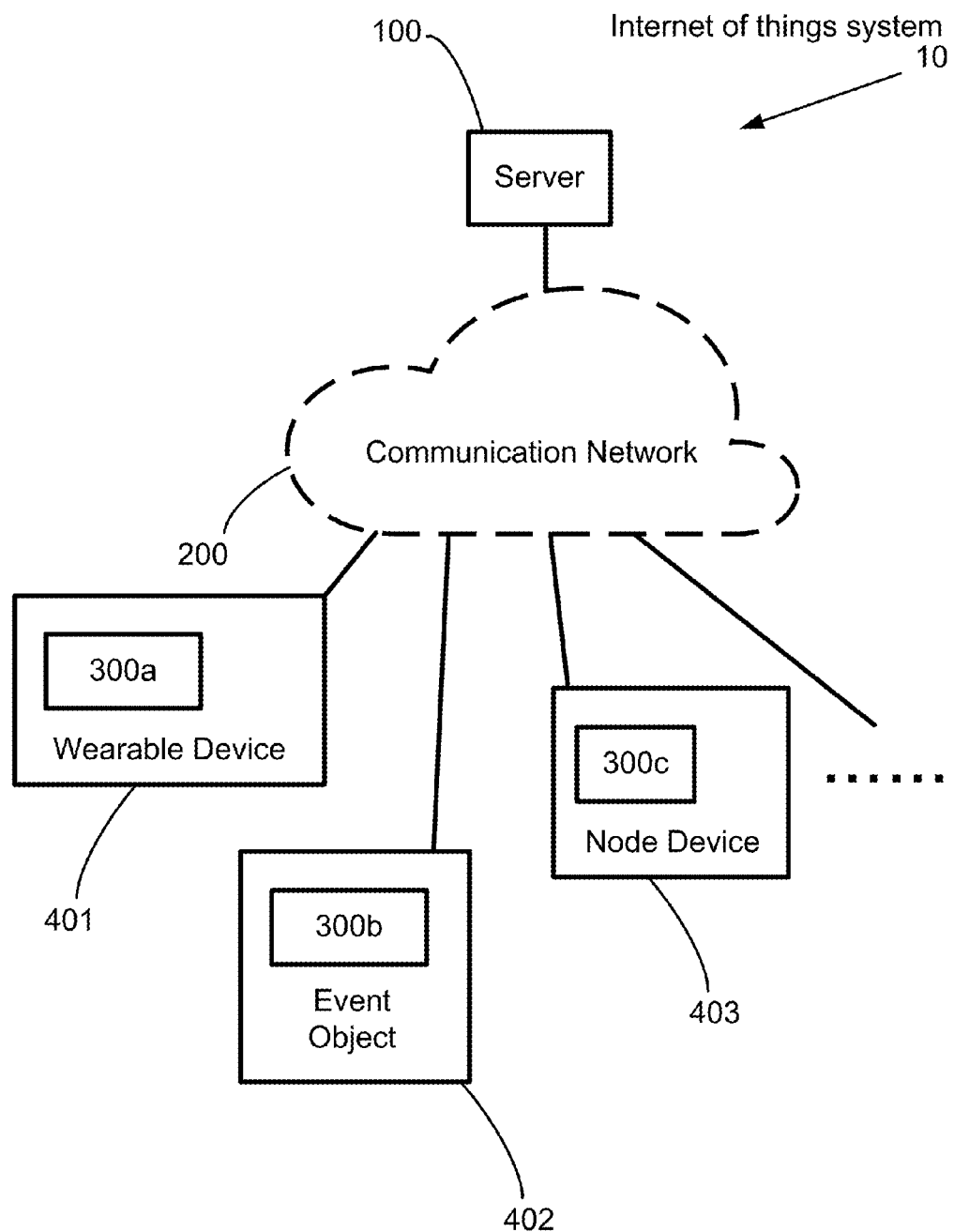
FIG. 5 is a schematic illustration of the IOT system for event monitoring according to one embodiment of the present invention.

FIG. 5 schematically shows the IOT system 10 for event management according to one embodiment of the present invention. The IOT system 10 may comprise a server 100, a communication network 200, a wearable device 401 with a first wireless tag 300*a*, an event object 402 with a second wireless tag 300*b*, and a node device 403 with a third wireless tag 300*c*. The wireless tag 300*a*, 300*b*, and 300*c* may perform the same as the wireless tag 300 as illustrated previously, wherein the wireless tag 300*a*, 300*b*, and 300*c* may connect to one another and the communication network 200 for management purpose. The node device 403 may be a light or any other fixed objects installed with wireless tag 300*c* which may provide a location information to the surrounding wireless tags 300*a*, 300*b*, etc. The location information may be used for locating method as mentioned before to enable any device with wireless tag 300 to determine a current location. To monitor or manage an event, the wearable device 401 of a user may communicate with the event object 402 by short range communication, wherein the short range communication may allow transmitting of user information and/or event information between the wireless tag 300*a* and wireless tag 300*b*, and the user information and/or event information may further be sent to the server 100 via communication network 200. The wireless tag 300*a* may further comprise a sensor to obtain the personal distinctive feature from the user and send to the server 100, so identification of the user may be confirmed by the server 100. When the location of the event is needed, the wireless tag 300a may switch to long range communication to obtain the location information from the wireless tag 300c which has a fixed location such as a set of coordinates, e.g. longitude, latitude, altitude. After obtaining the location information, the locating method may be performed. It should be noted that, matching between locations in all embodiments means comparing coordinates of the locations, wherein the locations are matched to each other when the coordinates are determined in proximity to each other, e.g. coordinates are within 1 meter to each other.

In one embodiment of the present invention, the IOT system 10 may be used to manage a user's daily habit. For example, the user may wear the wearable device 401. The event object 402 may be a toilet, wherein the wireless tag 300b of the event object 402 may comprise a sensor 360 to detect whether the user approaches the toilet or not. The sensor 360 may be a PIR detector or any other types of sensor to detect living being. The detection of using the toilet may be established by switch the wireless tag 300b to the short range communication, so wireless tag 300b only detects the presence of the wireless tag 300a on the user when the user gets fairly close by short range communication. Once the user is detected using the toilet, either the wireless tag 300a of the wearable device 401 or the wireless tag 300b of the event object 402 may send an event information to the server 100 via the communication network 200. The event information in this case may comprise the time of using the toilet, the duration of using the toilet, and the user's identification information. The time of using the toilet is when the wireless tag 300b first detecting the wireless tag 300a with the short range communication. The duration of using the toilet will be from the time of using the toilet to the last detecting the wireless tag 300a by the wireless tag 300b. The user's identification information may be stored within the wireless tag 300a and sent to the wireless tag 300b when the wearable device 401 was first detected. Alternatively, once the wireless tag 300a is detected, both the wireless tag 300a and wireless tag 300b may communicate with the wireless tag 300c of the node device 403 by the long range communication to perform the locating method and determine a first current location of wireless tag 300a and a second current location of wireless tag 300b. Since the user of the wearable device 401 is using the toilet, the first current location should match the second current location as long as the user is still using the toilet. The wearable device 300a may continue performing the locating method, so the user has left the toilet once the first current location is not a match with the second current location. In other embodiment, the wearable device 401 may be a collar for an animal, wherein the daily habit of the animal may be monitored by the server 100, and an owner of the animal may be able to monitor the animal by connecting to the server 100 by internet or a terminal device installed with wireless tag 300. For example, the collar may be able to perform locating method so the owner is able to obtain the animal's current location. The event object 402 may be installed at the animal's meal/water plate to monitor the frequency and exact time of the animal's eating/drinking activities. The event object 402 may even be installed on an animal food dispensing unit, wherein the event object 402 is configured to control the dispensing of animal food. Thus, the owner may send a signal to the event object 402 via the server 100 and the communication network 200 to control how much food to feed to the animal.

In another embodiment of the present invention, the IOT system 10 may be used to manage entrance/exit of an area. For example, the event object 402 may be a door of the area, wherein the wireless tag 300b of the event object 402 may further comprise an actuator (not shown) to control the door to open or close. A user of the wearable device 401 may approach the door for entrance or exit by connecting the wireless tag 300a to the wireless tag 300b by a short range communication to ensure the security of the area, wherein the wireless tag 300a may comprise the user's identification information. The identification information as a user information may then be sent to the server 100 together with "entrance/exit request" as an event information via the communication network 200 by the wireless tag 300b for verification. Once the server 100 verifies the identification information is allowed to enter, the server 100 may send a signal to the wireless tag 300b to open the door by the actuator. The verification of the identification information may be done by the server 100 which matches the identification information to a whitelist of user information in the server 100. The server 100 may also send a confirmation to the wearable device 401 if the verification was successful. If the identification information does not pass the verification, the server 100 may send a warning to the wearable device 401. Alternatively, the wireless tag 300b may comprise a finger print sensor for the user to input finger print. The finger print will be sent together with the identification information to the server 100 to ensure the one wearing the wearable device 401 is the actual owner of the wearable device 401. It should be noted that even though the finger print is used as an example of the embodiment, any other personal distinctive feature may be used instead, such as pulse, heart rate, blood pressure, blood glucose, etc.

In one embodiment of the present invention, the IOT system 10 may be used to manage a financial transaction. For example, the event object 402 may be a card machine, an ATM machine, a payment device, etc. The wireless tag 300b of the event object 402 may be switched to enable only short range communication to ensure the security of the financial transaction. The wireless tag 300a of the wearable device 401 may switch between the short range communication for conducting a financial transaction or long range communication for performing the locating method. The wireless tag 300a may comprise an account information which may be sent to the wireless tag 300b of the event object 402 by the short range communication for financial transaction. After the wearable device 401 making a connection with the event object 402 with short range communication, the wireless tag 300a may send the account information to the wireless tag 300b. The wireless tag 300b may then send the account information as a user information together with "financial transaction" as an event information to the server 100 via the communication network 200. The server 100 may verify the financial transaction, and only proceed the financial transaction when the verification is successful. Otherwise, the financial transaction will be rejected by the server 100 when the verification fails. The verification may be done by comparing the location of wireless tag 300a and the location of wireless tag 300b to prevent any device other than the wearable device 401 sending the account information to wireless tag 300b. When the result of the comparing is a match, the verification is successful. Thus, the server 100 may send a confirmation to the wireless tag 300a and/or wireless tag 300b. Otherwise, the server 100 may send a warning to the wireless tag 300a and/or 300b if the verification has failed. Alternatively, the wireless tag 300b may further comprise a sensor 360 for a user to input the personal distinctive feature such as finger print. The financial transaction may only be proceeded by the server 100 when the finger print received from the wireless tag 300b is a match to the account information.

In another embodiment of the present invention, the event object 402 may be a portable transaction machine. The transaction may be initiated by the wearable device 401 sending the account information as user information to the portable transaction machine by short range communication. And the user of the wearable device 401 may enter his/her fingerprint into the portable transaction machine as a second user information other than the account information to double check his/her identification. The portable transaction machine may send both fingerprint and account information to the server 100 for verification by long range communication. Alternatively, the user may use a credit card to the portable transaction machine to initiate the transaction. In this case, the locations of the wearable device 401 and the portable transaction machine may be matched by the server 100 for verifying the user of the wearable device 401 is the one using the credit card. The user may also enter his/her fingerprint to further ensure his/her identification is a match to the credit card.

Figure 6:
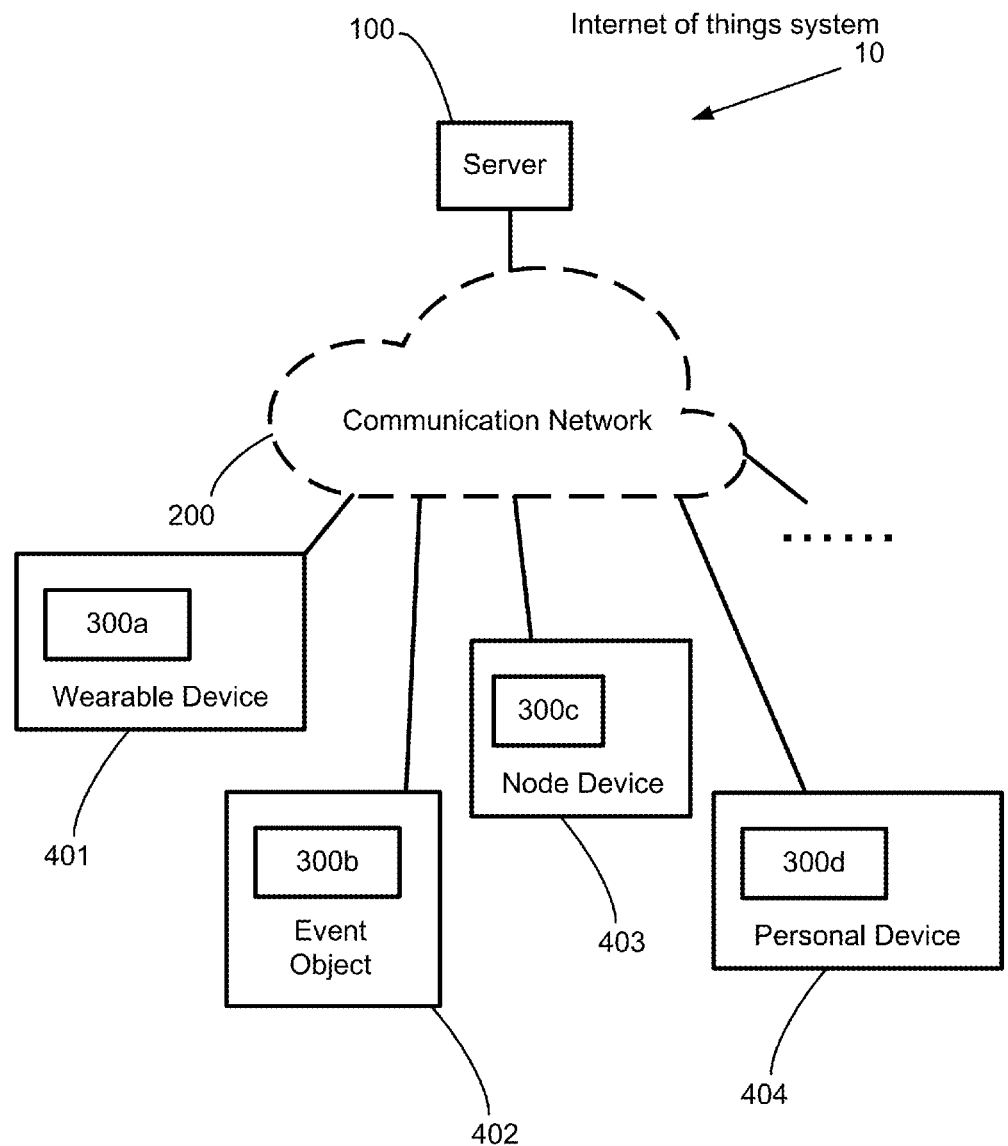
FIG. 6 is a schematic illustration of the IOT system for event monitoring according to another embodiment of the present invention.

FIG. 6 schematically shows the IOT system 10 which further comprises a personal device 404 installed with a wireless tag 300d, wherein the wireless tag 300d may perform the same as the wireless tag 300 as mentioned before. As mentioned before, the IOT system 10 may manage a financial transaction and verify the account information in order to proceed or reject the financial transaction. The aforementioned verification of financial transaction may also be done by matching the location of the personal device 404, the location of the wearable device 401, and the location of the event object 402. By matching the three locations to further ensure the financial transaction is not a fraud by anyone other than the account owner using the wearable device 401. In other embodiments, the personal device 404 with the wireless tag 300d may also be used for any other types of verifications in various event management. For example, entrance/exit of an area. This may be done the same by matching locations between related wireless tags 300a, 300b, and 300d. If the locations of the three wireless tags 300a, 300b, and 300d are the same, it shows that the personal device 404 and the wearable device 401 are at the location of event object 402 which is a door in this case. It should be noted that, all the wearable device 401 and personal device 404 may also be other devices installed with wireless tag 300a such as a mobile device, a personal computer, a portable device, an implanted device, etc. The same approach applies to any other terminal devices in all embodiments.

In another embodiment of the present invention, the user mentioned above may not only be human or animal, but also a robot, wherein at least one wireless tag 300 may be installed on the robot for monitoring the robot's location and action within a network of more than one wireless tags 300. The aforementioned event monitoring/management approach may apply to the robot as well. Furthermore, an owner of the robot may send control signal to control the action of the robot as long as the owner is able to connect to the server 100 by internet or a terminal device with wireless tag 300.

Previous descriptions are only embodiments of the present invention and are not intended to limit the scope of the present invention. Many variations and modifications according to the claims and specification of the disclosure are still within the scope of the claimed invention. In addition, each of the embodiments and claims does not have to achieve all the advantages or characteristics disclosed. Moreover, the abstract and the title only serve to facilitate searching patent documents and are not intended in any way to limit the scope of the claimed invention.

What is claimed is:

1. A method for a management system, comprising:
receiving an information of an event;
verifying the event by the following steps:
    determining a first location of a first wireless tag,
    determining a second location of a second wireless tag,
    wherein when the first wireless tag and the second wireless tag receives a location information from a wireless tag via a short range communication, the first location and the second location are determined as a location of the wireless tag, and when the first wireless tag and the second wireless tag do not receive any location information via a short range communication, the first wireless tag and the second wireless tag receives the location information and a RSSI corresponding to the location information via a long range communication, wherein the location information comprises a real-world coordinate, wherein the short range communication is provided by a Bluetooth module coupled to a resistor and the resistor coupled to a ground and a communication range of the short range communication is less than 3 centimeters and the long range communication is longer than the short range communication and is provided by the Bluetooth module coupled to an antenna;
matching the first location to the second location;
sending a confirmation to the first wireless tag or the second wireless tag when the verification is successful.

2. The method for a management system according to claim 1, wherein the verification is successful when the first location matches the second location.

3. The method for a management system according to claim 1, verifying the event further comprising:
receiving an account information from the first wireless tag;
receiving an user information from the second wireless tag via the short range communication; and
verifying the user information against the account information.

4. The method for a management system according to claim 3, wherein the verification is successful when the first location matches the second location and the user information matches the account information.

5. The method for a management system according to claim 3, wherein the user information is a personal distinctive feature from a sensor in the second wireless tag.

6. A management system for verifying a transaction, comprising:
a server;
a communication network;
a wireless tag comprising:
    a Bluetooth chip;
    a resistor;
    an antenna;
    a switch, wherein the Bluetooth chip couples to the antenna or the resistor via the switch; and
    a MCU, coupled to the Bluetooth chip and the switch, wherein the MCU controls the switch for the Bluetooth chip to couple to the antenna to provide a long range communication and controls the switch for the Bluetooth chip to couple to the resistor to provide a short range communication;

wherein the wireless tag communicates with another wireless tag by the short range communication via the Bluetooth chip to verify the transaction, wherein the Bluetooth chip provides, by the Bluetooth chip coupled to the resistor via the switch and the resistor coupled to a ground, the short range communication with communication range less than 3 centimeters.

7. The management system according to claim 6, wherein the wireless tag is installed in terminal devices comprising a wearable device, a mobile device and a node device, or event objects comprising a card machine, an ATM machine and a payment device.

8. The management system according to claim 6, wherein the wireless tag sends a user information to the server, and the server compares the user information to an account information of the transaction to verify the transaction.

9. The management system according to claim 8, wherein the wireless tag further comprises a sensor, and the user information is a personal distinctive feature sensed by the sensor.

10. The management system according to claim 8,
wherein the wireless tag sends the user information to the server via a transaction device, and
wherein the user information sending from the wireless tag to the transaction device is through the short range communication.

11. An event monitoring system, comprising:
a server;
a communication network;
a wireless tag comprising:
  a Bluetooth chip;
  a resistor;
  an antenna;
  a switch, wherein the Bluetooth chip couples to the antenna or the resistor via the switch; and
  a MCU, coupled to the Bluetooth chip and the switch, wherein the MCU controls the switch for the Bluetooth chip to couple to the antenna to provide a long range communication and controls the switch for the Bluetooth chip to couple to the resistor to provide a short range communication;
wherein the wireless tag detects a terminal device by the Bluetooth chip using the short range communication, wherein the Bluetooth chip provides, by the Bluetooth chip coupled to the resistor via the switch and the resistor coupled to a ground, the short range communication with communication range less than 3 centimeters;

after detecting the terminal device, the wireless tag sends an event information to the server via the communication network using the long range communication provided by the Bluetooth chip coupled to an antenna.

12. The event monitoring system according to claim 11, wherein the wireless tag further comprising a sensor, and wherein the sensor detects a status of the event to send to the server as an event information.

13. The event monitoring system according to claim 11,
wherein the wireless tag is installed in a transaction device, and
wherein the wireless tag is configured to receive an account information by the short range communication, and
wherein the account information is sent to the server for verification against a user information.

14. The event monitoring system according to claim 11,
wherein the wireless tag further comprising sensor, and
wherein the sensor detects a personal distinctive feature from a user and sends the personal distinctive feature to the server as a user information.

15. The event monitoring system according to claim 11,
wherein the wireless tag receives an identification information from the terminal device, and
wherein the identification information is sent to the server for verification.

16. The event monitoring system according to claim 13,
wherein the user information is sent by a second wireless tag to the server, and
wherein the user information is a personal distinctive feature sensed by a sensor in the second wireless tag.

17. The management system according to claim 6, wherein the wireless tag receives a location information from a node device via the Bluetooth module with the long range communication;
wherein the wireless tag determines a first location according to the location information and sends the first location to the server via the communication network;
wherein the server compares the first location to a transaction location to verify the transaction.

18. The event monitoring system according to claim 11, wherein the wireless tag receives a location information from a node device via the Bluetooth module with the long range communication;
wherein the wireless tag determines a first location according to the location information and sends the first location to the server via the communication network.

* * * * *